United States Patent Office 3,401,500
Patented Sept. 17, 1968

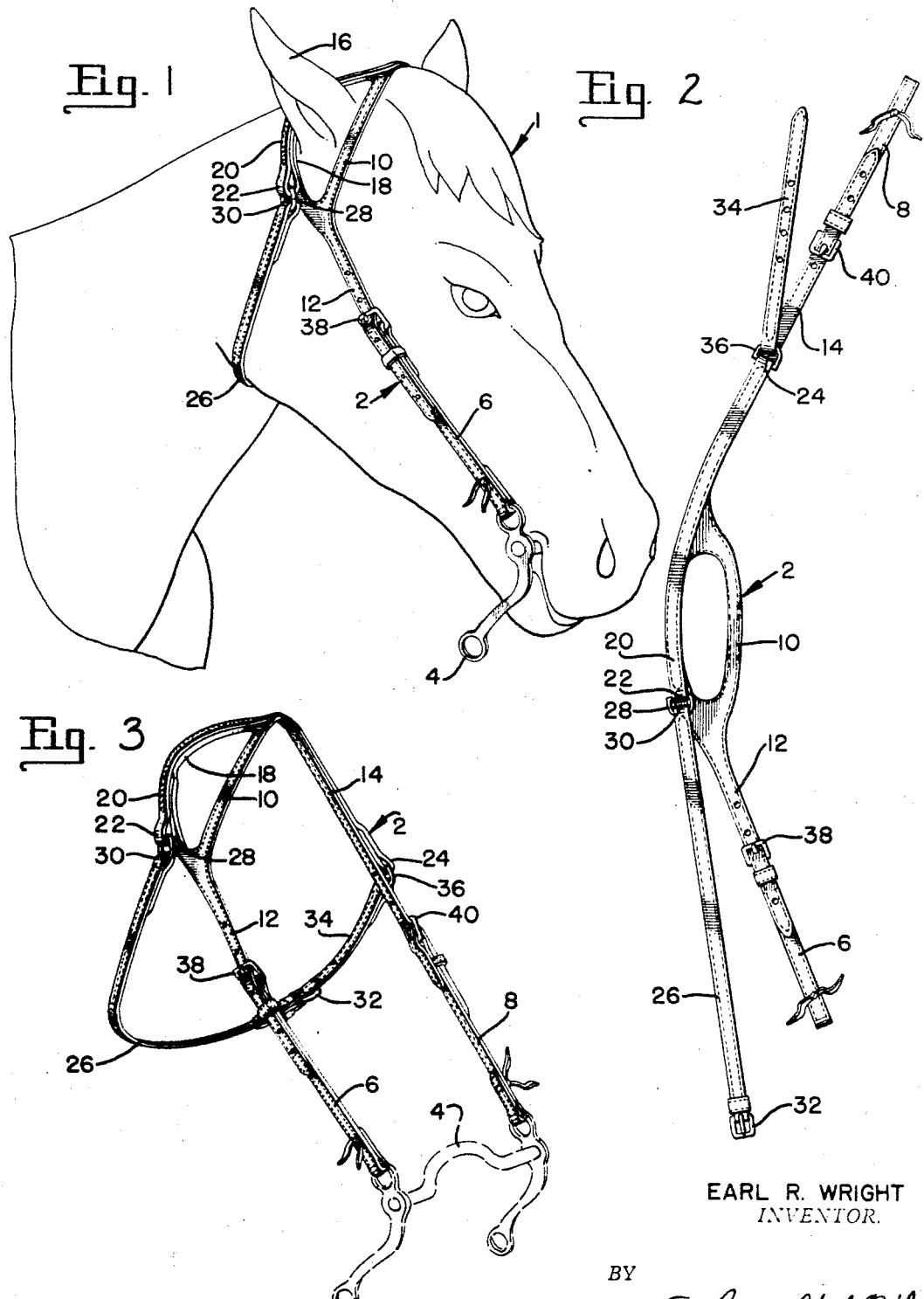

3,401,500
ONE-EAR BRIDLE OR HALTER WHICH CONFORMS TO THE ANIMAL'S HEAD
Earl R. Wright, 100 E. Grand,
Comanche, Tex. 76442
Filed May 25, 1966, Ser. No. 552,787
4 Claims. (Cl. 54—6)

ABSTRACT OF THE DISCLOSURE

A bridle or halter to surround one ear of an animal, which bridle or halter has an apertured portion which surrounds the ear and extends downward on each side of the head toward a bit. An apertured portion of the halter or bridle is cut from a single piece of leather of a general curvilinear pattern, when laid flat, so when fitted around an ear on the head of a horse, the apertured portion thereof will lie in conformed relation with respect to the head of the horse, without wrinkling, buckling or being loose. Other straps are associated with the basic curvilinear, apertured portion so as to permit adjustment of the bridle or halter with respect to the length of the head of the horse and with respect to the distance beneath the jaw.

---

This invention relates to improvements in bridles or halters and more particularly to a halter or bridle which surrounds only one ear of the animal on which the bridle or halter is used.

Various bridles and halters have been proposed heretofore which only encompass one ear of the animal; however, as far as known to the applicant, none of the one-ear bridles or halters are so constructed as to be form fitting around the ear and head of the animal so that the straps thereof lie substantially flat with the surface of the animal's head.

The present invention is so constructed that one area is encompassed by the bridle or halter in such manner that the straps of the halter lie flat on each side of the ear and across the forehead of an animal so as to make a comfortable bridle or halter and at the same time make a much more attractive bridle or halter for an animal that is being shown or displayed.

The various bridles or halters, so far as known, which have been made heretofore and which encompassed only a single ear, were made, primarily, of single, straight, longitudinal straps with an ear loop sewed thereonto, which was so constructed that when passed over the animal's head the forward portion of the loop would be of an excessive length and would be loose, which, when in use, would tend to twist or turn sidewise, which is uncomfortable to the animal and unsightly as a bridle or halter for the animal being shown or displayed.

An object of this invention is to provide a bridle or halter for an animal of the type that surrounds only one ear and which lies substantially flat on an animal's head at all times.

Another object of the invention is to provide a one-ear bridle or halter made of a minimum number of parts and which is so constructed as to be form fitting when placed on a horse's head, and which will lie in substantially a flat plane when partially disassembled.

Still another object of the invention is to provide a bridle or halter which is cut from leather in a curvilinear manner so that the portion surrounding an ear will lie flat at all times.

Another object of the invention is to provide a bridle or halter which may be fitted over one ear of an animal and which halter or bridle is form fitting, easy to manufacture and to adjust, and relatively low in the cost of manufacture.

With these objects in mind and others which will become evident as the description proceeds, reference is to be had to the accompanying drawing in which like reference characters designate like parts in the several views thereof, in which:

FIG. 1 is a perspective view showing a horse's head with a bridle fitted thereon and showing the manner in which the bridle fits around the ear without curling or distortion;

FIG. 2 is a flat layout of the assembled bridle, but without a bit thereon; and

FIG. 3 is a perspective view of the bridle similar to FIG. 1, but shown apart from the horse's head and showing the bit thereof in dashed outline.

With more detailed reference to the drawing, the numeral 1 designates generally a horse's head having a harness instrumentality such as a bridle generally designated by the numeral 2 fitted thereon, which for purpose of illustration is shown to have a bit 4 attached to the straps 6 and 8; however, the bit 4 may be dispensed with if desired, and a band substituted therefor so as to form a conventional halter, which arrangement is well known in the art of halters.

The present invention has a shorter forward strap 10 between upper straps 12 and 14 so, when the upper head portion of the bridle or halter is placed over ear 16, the short strap 10 will lie forward of ear 16 and a longer strap 18 will lie rearward of the ear 16. However, due to the curvature of the head behind the ear 16, the strap 18 is longer than the forward strap 10 and, when correctly fitted on the horse's head, designated at the numeral 1, the strap 10 will lie flat on the forehead, and the strap 18 and straps 12 and 14 will lie in form fitting relation along the horse's head. This arrangement is comfortable for the animal to wear and, furthermore, it creates a more artistic headdress for an animal in a horse show, as many show animals are exhibited with one-ear bridles or halters to enable the maximum portion of the head to be seen, with a minimum disguising harness thereon. It is preferable that the strap 18, rearward of the ear 16, be reinforced with a strap 20, which has a loop 22 formed in one end thereof and a loop 24 formed in the opposite end. These straps may be stitched together or secured in such other conventional manner as might be desirable. A strap 26 is attached to strap 20 by a D-ring 28 which passes through loop 22 in strap 20 and a loop 30 in strap 26. This strap may have a buckle 32 thereon to receive a perforated end of strap 34 which is attached to strap 20 by a D-ring 36, as will best be seen in FIG. 2.

The D-rings 28 and 36 permit straps 26 and 34 to be fastened together by buckle 32 in such manner as to fit snugly about the head 1, at the upper portion of the jaws thereof. Buckles 38 and 40 are provided on straps 6 and 8 to receive the respective perforate ends of upper straps 12 and 14, to enable the length of these straps to be readily adjustable to fit horses, with heads of different sizes, so the bit 4 will be comfortable in the horse's mouth.

It may be readily appreciated that a range of sizes of bridles or halters with the various adjustments provided and with the straps fitting snugly around the head, the bridle or halter 2 may be readily adjusted to almost any horse's head so as to be comfortable, within the general range of the size of the bridle.

It is to be pointed out that it is preferable to cut the main body portion of the bridle or halter, comprising straps 10, 12, 14, and 18, from a single piece of sheet leather, in a curvilinear shape, in the manner substantially as shown in FIG. 2; then reinforcing strap 18 may be sewed or otherwise appliqued to the top thereof in a conforming manner, as will best be seen in FIG. 2. Strap 20 may be cut in a curvilinear manner from sheet leather and which strap will be form fitting for the length of the bridle or halter. It is for this reason, therefore, that it is preferable to cut all curvilinear pieces from sheet leather, to the desired contours, prior to their assembly and this construction will maintain its true shape over an indefinite period of time, because the leather will not be distorted or stretched in order to correctly fit the animal's head, as this particular contoured arrangement does not require pre-stretching or cutting of the straps to make the device fit the animal's head.

Several sizes of bridles or halters may be provided to accommodate the head sizes of the various animals on which the bridles or halters are used; however, a minimum of sizes may be required as the bridle or halter is fully adjustable and will be in form fitting relation on the head of the animal.

Having thus clearly shown and described the invention, what is claimed as new and desired to be secured by Letters Patent is:

1. A headstall for an animal including an elongated first main piece of strap material curved longitudinally in the plane of the strap in one direction, a second strap formed integrally with said main strap near an end of the main strap curved longitudinally in the plane of said second strap in an opposite direction than said main strap, said second strap forming with said main strap an opening therebetween of a size and shape to receive an ear of the animal, a portion of the main strap between the extremities of the second strap being of a greater length than said second strap, whereby when the headstall is positioned on the animal, the portion of the main strap between said extremities and behind the ear assumes a curved shape conforming with the shape of the animal's head and the second strap in front of the ear lies in substantially a flat plane adjacent the animal's head and below the curved portion of the main strap behind the ear.

2. A headstall as set forth in claim 1 wherein an additional third strap with loops formed on its ends is secured with the main strap providing reinforcement means and strap attaching means.

3. A headstall as set forth in claim 2 including a strap means connected to the ends of said third strap and encircling the neck of the animal.

4. A headstall as set forth in claim 1 including a pair of straps, each of said pair depending from each end of the first main strap to be attached to the animal's bit.

References Cited

Saddlelog, No. 75, Jan. 1, 1965, pages 3, 42, 43 and 83.
Retail Price List No. 1, applying to Saddlelog No. 75.

HUGH R. CHAMBLEE, *Primary Examiner.*